(12) United States Patent
Kim et al.

(10) Patent No.: US 9,204,404 B2
(45) Date of Patent: Dec. 1, 2015

(54) DEVICE FOR CONTROLLING UPLINK TRANSMISSION POWER AND A METHOD FOR THE SAME

(75) Inventors: Dong Cheol Kim, Anyang-si (KR); Wook Bong Lee, Anyang-si (KR); Jin Sam Kwak, Anyang-si (KR); Young Soo Yuk, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 13/578,547

(22) PCT Filed: Feb. 10, 2011

(86) PCT No.: PCT/KR2011/000883
§ 371 (c)(1),
(2), (4) Date: Oct. 22, 2012

(87) PCT Pub. No.: WO2011/099782
PCT Pub. Date: Aug. 18, 2011

(65) Prior Publication Data
US 2013/0039341 A1     Feb. 14, 2013

Related U.S. Application Data

(60) Provisional application No. 61/303,318, filed on Feb. 11, 2010.

(51) Int. Cl.
*H04W 4/00* (2009.01)
*H04W 52/50* (2009.01)
*H04W 36/00* (2009.01)
(Continued)

(52) U.S. Cl.
CPC .......... *H04W 52/50* (2013.01); *H04W 36/0055* (2013.01); *H04W 52/362* (2013.01); *H04W 52/40* (2013.01); *H04W 52/48* (2013.01)

(58) Field of Classification Search
CPC .......... H04B 17/0067; H04W 52/146; H04W 36/00; H04W 52/367; H04W 24/10
USPC ......... 370/328–329, 318, 320, 344, 348, 252, 370/345, 336, 350, 507; 455/216, 522, 436, 455/69, 63.1
See application file for complete search history.

(56) References Cited

U.S. PATENT DOCUMENTS 6,922,388 B1     7/2005    Laroia et al.
2004/0192201 A1  9/2004    Febvre et al.
(Continued)

FOREIGN PATENT DOCUMENTS

KR     10-2007-0119474     12/2007

*Primary Examiner* — Chandrahas Patel
*Assistant Examiner* — Lan Huong Truong
(74) *Attorney, Agent, or Firm* — Dentons US LLP

(57) ABSTRACT

Disclosed are a device for controlling uplink transmission power and a method for the same. In a terminal device for controlling uplink transmission power according to the present invention, a receiving antenna receives a first message containing a power correction value from a base station. A processor determines the transmission power value which will be used in transmitting a second message, based on the power correction value. A sending antenna transmits the second message to the base station, using the determined transmission power value, and, at this time, the power correction value is a value for correcting the transmission-power value is a value for correcting the transmission-power value which was used during initial ranging by the terminal or handover ranging of the terminal.

14 Claims, 2 Drawing Sheets

(51) Int. Cl.
*H04W 52/36* (2009.01)
*H04W 52/40* (2009.01)
*H04W 52/48* (2009.01)

(56) References Cited

U.S. PATENT DOCUMENTS

| | | | |
|---|---|---|---|
| 2006/0003787 A1* | 1/2006 | Heo et al. | 455/522 |
| 2007/0021119 A1* | 1/2007 | Lee et al. | 455/436 |
| 2007/0202882 A1* | 8/2007 | Ju et al. | 455/450 |
| 2008/0159427 A1* | 7/2008 | Kang et al. | 375/260 |
| 2008/0232330 A1* | 9/2008 | Lee et al. | 370/335 |
| 2008/0259903 A1* | 10/2008 | Lim et al. | 370/349 |
| 2009/0067404 A1* | 3/2009 | Lee et al. | 370/345 |
| 2009/0318166 A1* | 12/2009 | Kim et al. | 455/456.1 |
| 2010/0046479 A1* | 2/2010 | Sampath et al. | 370/335 |
| 2010/0150100 A1* | 6/2010 | Chen et al. | 370/330 |
| 2010/0182900 A1* | 7/2010 | Sung et al. | 370/210 |
| 2010/0234059 A1* | 9/2010 | Yang et al. | 455/522 |

* cited by examiner

DEVICE FOR CONTROLLING UPLINK TRANSMISSION POWER AND A METHOD FOR THE SAME

This Application is a 35 U.S.C. §371 National Stage Entry of International Application No. PCT/KR2011/000883, filed Feb. 10, 2011 and claims the benefit of U.S. Provisional Application No. 61/303,318, filed Feb. 11, 2010, which is incorporated by reference in its entirety herein.

TECHNICAL FIELD

The present invention relates to wireless communication, and more particularly, to a device and method for controlling uplink transmit power.

BACKGROUND ART

A wideband wireless communication system is based on an orthogonal frequency division multiplexing (OFDM) scheme or an orthogonal frequency division multiple access (OFDMA) scheme, in which a physical channel signal is transmitted using a plurality of subcarriers so as to transmit data at a high speed.

In a wireless communication system, there is a need for synchronization between a transmitter and a receiver for data reception and demodulation. In particular, in a wireless communication system in which a channel environment between a base station (BS) and a mobile station (MS) is consistently changed, synchronization between the BS and the MS is performed through signaling, for successful data transmission and reception. Since the BS transmits a signal to several MSs at one reference timing in downlink, no problem occurs. However, since several MSs individually transmit signals in uplink and the signals reach the BS at different timings, propagation delay may be different. Accordingly, there is a separate timing synchronization method, which is referred to as ranging. That is, ranging enables several MSs to accurately adjust synchronization of a transmission time.

A plurality of MSs performs downlink synchronization with a data frame transmitted by a BS. As a method of enabling the MSs to perform synchronization, the BS may insert a preamble for synchronization into a part of a transmitted frame. Then, the MSs perform synchronization for a downlink channel through the preamble. Alternatively, the BS may use a separate synchronization channel.

In uplink, in order to avoid interference between the MSs and enable the BS to receive data, each MS transmits data to the BS through a time and/or frequency domain allocated thereto. Accordingly, for uplink synchronization, it is necessary to adjust synchronization between the BS and the MS through signaling in consideration of the channel environment of each MS.

An initial ranging process obtains an accurate timing offset between an MS and a BS and initially controls transmit power. If the MS is powered on, the MS acquires downlink synchronization from a received downlink preamble signal. Subsequently, the MS performs initial ranging in order to control an uplink timing offset and transmit power. Unlike initial ranging, periodic ranging periodically tracks an uplink timing offset and received signal strength after initial ranging. In addition, there are a bandwidth request ranging process of, at an MS, requesting a desired bandwidth from a BS and a handover ranging process performed by an MS for synchronization with another BS during handover.

Handover ranging is necessary to perform handover to a target BS at a moving MS. Handover ranging is equal to initial ranging except that the MS and the target BS may acquire a non-contention initial ranging transmission opportunity in order to perform a management message transmission/reception procedure for network entry/reentry. The MS may include information about a serving BS ID and a ranging purpose indicator in a ranging request message so as to inform the target BS that handover is currently being performed. In this case, if the target BS does not receive information about the MS in advance through a backbone, the target BS may request the information about the MS from the BS through the backbone.

It takes considerable time to receive all transmit power parameters associated with transmission of a ranging request message from the MS to the BS after initial ranging or handover ranging. Accordingly, there is a need for a new method for determining a power value used to transmit ranging request message by an MS.

DISCLOSURE

Technical Problem

An object of the present invention is to provide a method of controlling uplink transmit power at a mobile station (MS).

Another object of the present invention is to provide a method of controlling uplink transmit power at a base station (BS).

Another object of the present invention is to provide an MS for controlling uplink transmit power.

Another object of the present invention is to provide a BS for controlling uplink transmit power.

The technical problems solved by the present invention are not limited to the above technical problems and other technical problems which are not described herein will become apparent to those skilled in the art from the following description.

Technical Solution

The object of the present invention can be achieved by providing a method of controlling uplink transmit power at a mobile station (MS) in a wireless communication system, the method including receiving a first message including a power correction value from a base station (BS), determining a transmit power value to be used to transmit a second message based on the power correction value, and transmitting the second message to the BS with the determined transmit power value, wherein the power correction value is a correction value of a transmit power value used when the MS performs an initial ranging or when the MS performs an handover ranging.

The power correction value may be a correction value of a transmit power value used when the MS performs a last initial ranging or when the MS a last performs handover ranging.

The first message further include acknowledgement/negative acknowledgement (ACK/NACK) for transmission of the initial ranging or handover ranging. The first message may further include uplink resource allocation information for transmission of a ranging request. The second message is a message for requesting ranging to the BS.

The determined transmit power value may be determined by adding the power correction value and a transmit power value used when the MS performs the last initial ranging or when the MS performs the last handover ranging.

According to another aspect of the present invention, there is provided a method of controlling uplink transmit power of a mobile station (MS) at a base station (BS) in a wireless communication system, the method including determining a power correction value to be transmitted to the MS, transmitting a first message including the determined power correction value to the MS, and receiving, from the MS, a second message transmitted with a transmit power value determined based on the power correction value, wherein the determined power correction value is a correction value of a transmit power value used when the MS performs an initial ranging or when the MS performs an handover ranging.

According to another aspect of the present invention, there is provided a mobile station (MS) for controlling uplink transmit power in a wireless communication system, the MS including a receive antenna configured to receive a first message including a power correction value from a base station (BS), a processor configured to determine a transmit power value to be used to transmit a second message based on the power correction value, and a transmit antenna configured to transmit the second message to the BS with the determined transmit power value, wherein the power correction value is a correction value of a transmit power value used when the MS performs an initial ranging or when the MS performs an handover ranging.

The first message may further include acknowledgement negative acknowledgement (ACK/NACK) for transmission of the initial ranging or handover ranging, and the second message may be a message for requesting ranging to the BS.

According to another aspect of the present invention, there is provided a base station (BS) for controlling uplink transmit power of a mobile station (MS) in a wireless communication system, the BS including a processor configured to determine a power correction value to be transmitted to the MS, a transmit antenna configured to transmit a first message including the determined power correction value to the MS, and a receive antenna configured to receive, from the MS, a second message transmitted with a transmit power value determined based on the power correction value, wherein the determined power correction value is a correction value of a transmit power value used when the MS performs an initial ranging or when the MS performs an handover ranging.

The first message may further include acknowledgement for transmission of the initial ranging or handover ranging, and the second message may be a message for requesting ranging by the MS.

Advantageous Effects

According to the embodiments of the present invention, it is possible to efficiently set power necessary to transmit uplink data before all power control information is received after a mobile station (MS) performs initial uplink synchronization.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters. For example, the following description will be made on the assumption of an IEEE 802.16m mobile communication system, but the present invention is applicable to other mobile communication systems excluding the unique matters of the IEEE 802.16m system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user end device such as a user equipment (UE), a mobile station (MS) and an advanced mobile station (AMS), and a base station includes a node of a network end communicating with a terminal, such as a Node-B, an eNode B, a base station and an access point (AP).

In a mobile communication system, an MS may receive information from a BS in downlink and transmit information in uplink. Information transmitted or received by the MS includes data and a variety of control information and a physical channel varies according to the kind and usage of information transmitted or received by the MS.

Figure 1:
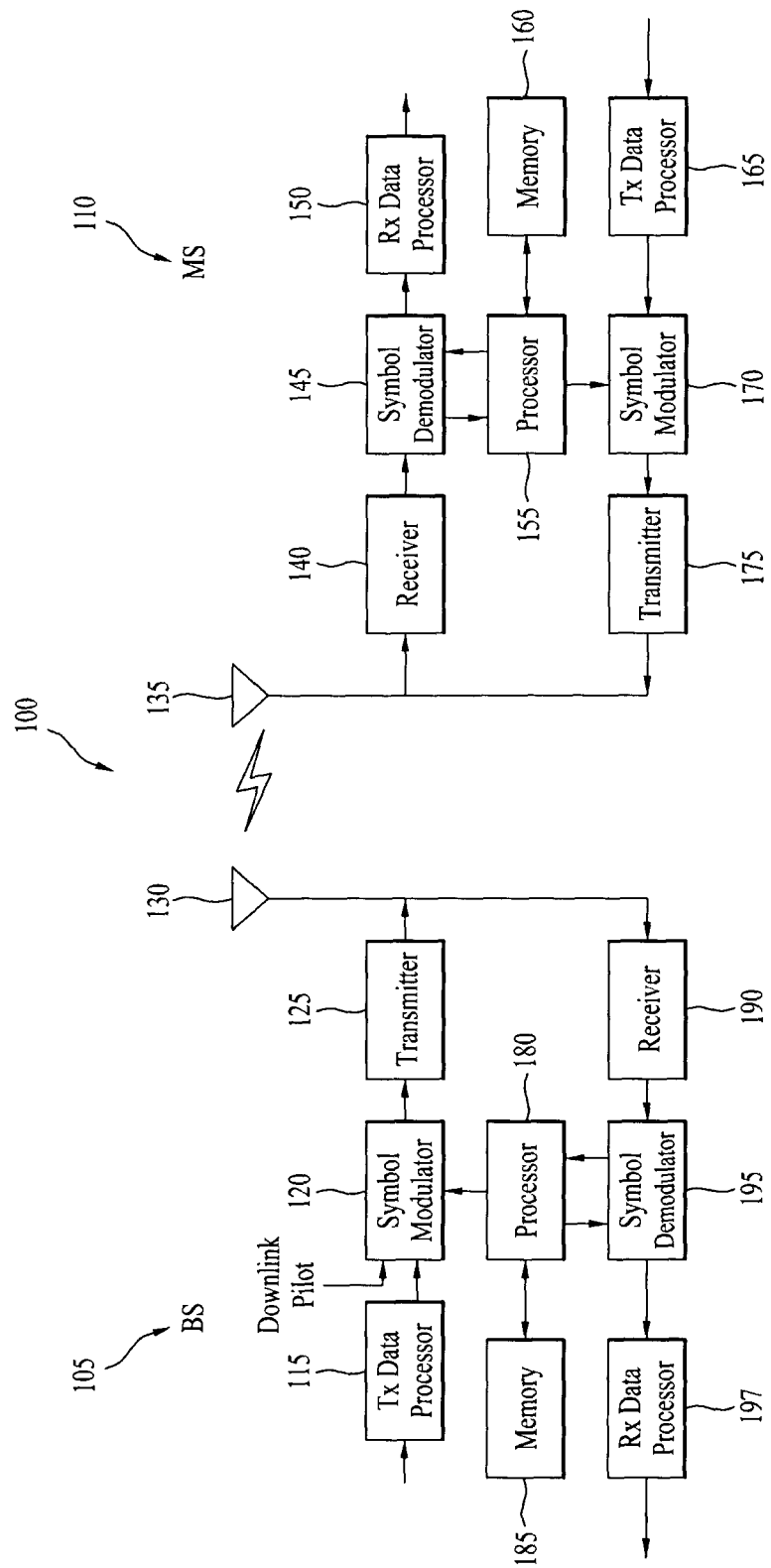
FIG. 1 is a block diagram showing the configuration of a base station (BS) 105 and a mobile station (MS) 110 in a wireless communication system 100.

FIG. 1 is a block diagram showing the configuration of a BS 105 and an MS 110 in a wireless communication system 100.

Although one BS 105 and one MS 110 are shown in order to simplify the configuration of the wireless communication system 100, the wireless communication system 100 may include one or more BSs and/or one or more MSs.

Referring to FIG. 1, the BS 105 may include a transmission (Tx) data processor 115, a symbol modulator 120, a transmitter 125, a transmit/receive antenna 130, a processor 180, a memory 185, a receiver 190, a symbol demodulator 195, and a reception (Rx) data processor 197. The MS 110 may include a Tx data processor 165, a symbol modulator 170, a transmitter 175, a transmit/receive antenna 135, a processor 155, a memory 160, a receiver 140, a symbol demodulator 145, and an Rx data processor 150. Although one antenna 130 and one antenna 135 are respectively included in the BS 105 and the MS 110, each of the BS 105 and the MS 110 includes a plurality of antennas. Accordingly, the BS 105 and the MS 110 according to the present invention support a Multiple Input Multiple Output (MIMO) system. The BS 105 and the MS 110 according to the present invention support both a Single User-MIMO (SU-MIMO) scheme and a Multi User-MIMO (MU-MIMO) scheme.

In downlink, the Tx data processor 115 receives traffic data, formats and codes the received traffic data, interleaves and modulates the coded traffic data (or performs symbol mapping), and provides modulated symbols ("data symbols"). The symbol modulator 120 receives and processes the data symbols and pilot symbols and provides a symbol stream.

The symbol modulator 120 multiplexes data and pilot signals and transmits the multiplexed data to the transmitter 125. At this time, the transmitted symbols may be data symbols, pilot symbols or signals having a value of zero. In each symbol period, the pilot symbols may be consecutively transmitted. The pilot symbols may be Frequency Division Multiplexed (FDM), Orthogonal Frequency Division Multiplexed (OFDM), Time Division Multiplexed (TDM) or Code Division Multiplexed (CDM) symbols.

The transmitter 125 receives and converts the symbol stream into one or more analog signals, additionally adjusts (e.g., amplifies, filters, and frequency-up-converts) the analog signals, and generates a downlink signal suitable for transmission through a radio channel. Subsequently, the downlink signal is transmitted to the MS through the antenna 130.

In the MS 110, the receive antenna 135 receives the downlink signal from the BS and provides the received signal to the receiver 140. The receiver 140 adjusts (e.g., filters, amplifies, frequency-down-converts) the received signal and digitizes the adjusted signal so as to acquire samples. The symbol demodulator 145 demodulates the received pilot symbols and provides the demodulated pilot symbols to the processor 155, for channel estimation.

The symbol demodulator 145 receives downlink frequency response estimation values from the processor 155, performs data demodulation with respect to the received data symbols, acquires data symbol estimation values (which are estimation values of the transmitted data symbols), and provides the data symbol estimation values to the Rx data processor 150. The Rx data processor 150 demodulates (that is, symbol-demaps and deinterleaves) the data symbol estimation values, decodes the demodulated values, and restores transmitted traffic data.

The processes performed by the symbol demodulator 145 and the Rx data processor 150 are complementary to the processes performed by the symbol modulator 120 and the Tx data processor 115 of the BS 105.

In the MS 110, in uplink, the Tx data processor 165 processes the traffic data and provides data symbols. The symbol modulator 170 receives the data symbols, multiplexes the data symbols, performs modulation with respect to the symbols and provides a symbol stream to the transmitter 175. The transmitter 175 receives and processes the symbol stream, generates an uplink signal, and transmits the uplink signal to the BS 105 through the transmit antenna 135.

The BS 105 receives the uplink signal from the MS 110 through the receive antenna 130 and the receiver 190 processes the received uplink signal and acquires samples. Subsequently, the symbol demodulator 195 processes the samples and provides pilot symbols received in uplink and data symbol estimation values. The Rx data processor 197 processes the data symbol estimation values and restores traffic data transmitted from the MS 110.

The respective processors 155 and 180 of the MS 110 and the BS 105 instruct (e.g., control, adjust, manages, etc.) the respective operations of the MS 110 and the BS 105. The processors 155 and 180 may be connected to the memories 160 and 185 for storing program code and data. The memories 160 and 185 may be respectively connected to the processors 155 and 180 so as to store operating systems, applications and general files.

Each of the processors 155 and 180 may also be referred to as a controller, a microcontroller, a microprocessor, a microcomputer, etc. The processors 155 and 180 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 155 and 180.

If the embodiments of the present invention are implemented by firmware or software, the firmware or software may be configured to include modules, procedures, functions, etc. for performing the functions or operations of the present invention. The firmware or software configured to perform the present invention may be included in the processors 155 and 180 or may be stored in the memories 160 and 185 so as to be driven by the processors 155 and 180.

Layers of the radio interface protocol between the MS and the BS in the wireless communication system (network) may be classified into a first layer (L1), a second layer (L2) and a third layer (L3) based on the three low-level layers of the well-known Open Systems Interconnection (OSI) model. A physical layer belongs to the first layer and provides an information transport service through a physical channel. A Radio Resource Control (RRC) layer belongs to the third layer and provides control radio resources between the UE and the network. The MS and the BS exchange RRC messages with each other through a wireless communication network and the RRC layer.

Hereinafter, a method of determining uplink transmit power used to transmit an uplink signal at an MS will be briefly described. In general, the MS needs to determine an uplink transmit power value when transmitting the uplink signal. Equation 1 is used to determine uplink transmit power at the MS.

$$P(dBm) = L + SINR_{Target} + NI + \text{Offset} \qquad \text{Equation 1}$$

where, P denotes a transmit power level (unit: dBm) per subcarrier and stream in current transmission, and L denotes current average downlink propagation loss estimated by the MS. L includes transmit antenna gain of the MS and path loss. $SINR_{target}$ denotes a target uplink SINR value received from the BS. NI denotes a value received from the BS in an average noise and interference level (unit: dBm) per subcarrier estimated by the BS. An offset is a correction term for power offset per MS. This offset is transmitted from the BS through a power control message. There are two offset values: an offset value $\text{Offset}_{data}$ used to transmit data and an offset value $\text{Offset}_{control}$ used to transmit control information.

Upon application of Equation 1, the MS may immediately apply a signal to interference plus noise ratio (SINR) in case of a control channel for transmitting control information, but needs to set a target SINR using Equation 2 when transmitting data.

$$SINR_{Target} = \qquad \text{Equation 2}$$
$$10\log10\left(\max\left(10 \wedge \left(\frac{SINR_{MIN}(dB)}{10}\right), \gamma_{IoT} \times SIR_{DL} - \alpha\right)\right) - $$
$$\beta \times 10\log10(TNS)$$

where, $SINR_{MIN}$ (dB) denotes a minimum SINR value required by the BS, which is set by a unicast power control message. $SINR_{MIN}$ is expressed by 4 bits and the value thereof may be, for example, one of {−∞, −3, −2.5, −1, 0, 0.5, 1, 1.5, 2.5, 3, 3.5, 4, 4.5}. $SIR_{DL}$ denotes a ratio of a downlink signal measured by the MS to interference power. $\gamma_{IoT}$ denotes a fairness and IoT control factor, which is broadcast by the BS. α denotes a factor according to the number of receive antennas at the BS and is signaled as 3-bit MAC power control mode signaling, and the value thereof is expressed by a value $\{1, \frac{1}{2}, \frac{1}{4}, \frac{1}{8}, \frac{1}{16}, 0\}$. β may be set to 0 or 1 by 1-bit MAC power control mode signaling. TNS denotes the total number of streams in a logical resource unit (LRU) indicated by a UL-A-MAP IE. This value is set as Mt in case of single user-MIMO (SU-MIMO), where Mt is the number of streams per user. This value is set as TNS in case of CSM and is the total number of streams. This value may be set to 1 in case of control channel transmission.

Equation 3 computes transmit power of an uplink signal used when the MS performs initial ranging.

$$P_{TX\_IR\_MIN} = EIRxP_{IR,min} + BS\_EIRP - RSS \qquad \text{Equation 3}$$

where, $EIRxP_{IR,min}$ denotes minimum target receive power and BS_EIRP denotes transmit power of the BS. BS_EIRP is transmitted from the BS to the MS via S-SFH SP2 and SP1. Received signal strength (RSS) denotes the received signal strength measured by the MS.

When performing initial ranging, the MS may subtract the received signal strength (RSS) measured by the MS from a vale obtained by adding the minimum target receive power value $EIRxP_{IR,min}$ and the transmit power value BS_EIRP of the BS and use the subtracted value as a transmit power value for initial ranging.

If receive gain and transmit gain of the MS antenna are different, Equation 4 may be used.

$$P_{TX\_IR\_MIN} = EIRxP_{IR,min} + BS\_EIRP - RSS + (G_{Rx\_MS} - G_{Tx\_MS}) \qquad \text{Equation 4}$$

where, $G_{RX\_MS}$ denotes the receive gain of the MS antenna and $G_{TX\_MS}$ denotes the transmit gain of the MS antenna. When performing initial ranging, the MS may use a value obtained by further adding a value obtained by subtracting the transmit gain from the receive gain of the MS antenna to the term expressed by Equation 3 as a transmit power value.

Although Equations 3 and 4 show the transmit power values used by the MS upon initial ranging transmission, they are used to perform handover ranging at the MS.

Figure 2:
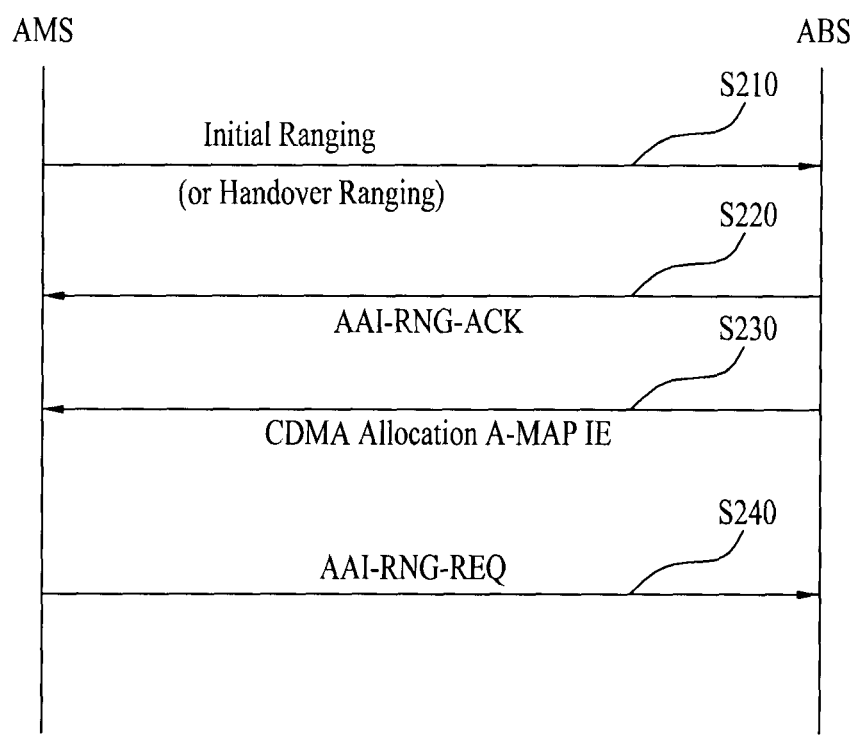
FIG. 2 is a diagram showing a process of performing initial ranging or handover ranging at an MS.

FIG. 2 is a diagram showing a process of performing initial ranging or handover ranging at an MS.

Referring to FIG. 2, the MS transmits initial ranging or handover ranging to the BS (S210) (hereinafter, it is assumed that the MS transmits initial ranging). Initial ranging is a process of obtaining an accurate timing offset with the BS and initially adjusting transmit power at the MS. In general, if the MS is powered on, the MS acquires downlink synchronization from a received downlink preamble signal. Subsequently, the MS performs initial ranging in order to adjust an uplink timing offset and transmit power. The MS selects a ranging preamble code from an initial ranging domain after selecting a ranging channel and transmits the selected ranging preamble code to the BS through the selected ranging channel (S210).

When the MS transmits initial ranging or handover ranging, the transmit power value calculated by Equation 3 or 4 may be used. When the MS transmits initial ranging or handover ranging to the BS with the transmit power value calculated using Equation 3 or 4, the BS may become aware of a power spectral density (PSD) level of the MS.

Thereafter, the BS may transmit an acknowledgement message to the UE in response to initial ranging or handover ranging transmitted by the MS (S220). This acknowledgement message may be defined as an AAI-RNG-ACK message. The AAI-RNG-ACK message provides a response indicating that ranging preamble codes have been successfully received and detected in all ranging opportunities. The BS may include three possible ranging statuses of initial ranging or handover ranging in the AAI-RNG-ACK message and transmit the message to the MS. The three possible ranging statuses included in the AAI-RNG-ACK message include a "continue" status, a "success" status and an "abort" status.

In the "continue" status, the AAI-RNG-ACK message may include necessary adjustment information. The AAI-RNG-ACK message may include adjustment information such as time, power and frequency. For example, the currently defined power adjustment level (e.g., 3 bits) included in the AAI-RNG-ACK message serves to correct power when next initial ranging or handover ranging is performed. The "continue" status is valid until the ranging status becomes the "success" status and the power value may be corrected using the power adjustment level parameter even in the AAI-RNG-ACK for delivering the final "success" status message. The MS may correct initial ranging or handover ranging if necessary.

If a ranging status of initial ranging or handover ranging is a "success" status, the BS may transmit a CDMA allocation A-MAP IE to the MS (S230). The BS provides uplink resource allocation information for ranging request transmission to the MS through the CDMA allocation A-MAP IE message.

If a ranging status of initial ranging or handover ranging is an "abort" status, the BS requests that the MS abort a ranging process.

As described above, the MS may receive a ranging status response from the BS through the AAI-RNG-ACK message. The MS which receives the ranging status response message from the BS may perform the following procedure according to the ranging status.

When the MS receives the "continue" status response and parameter adjustments through the AAI-RNG-ACK message and corrects (or adjusts) parameters, the MS continues to perform the ranging process as in a ranging process upon first entry using an available ranging channel with an arbitrary ranging preamble code selected from an initial ranging domain. That is, the UE transmits a ranging request message to the BS (S240). The ranging request message may be expressed by an AAI-RNG-REQ message.

When the MS receives the "success" state response through the AAI-RNG-ACK message, the MS waits until the BS provides uplink resource allocation. After the MS transmits the ranging preamble code (S210), if the CDMA allocation A-MAP IE for uplink resource allocation is not received until a predetermined timer has elapsed, the initial ranging procedure is performed again. However, if it is difficult to perform the initial ranging procedure again, it is necessary to perform downlink physical channel synchronization with the BS.

When the MS receives the CDMA allocation A-MAP IE from the BS (S230), the MS transmits a ranging request message to the BS (S240). Table 1 shows information included in the CDMA allocation A-MAP IE as a CDMA allocation A-MAP IE message format of IEEE 802.16.

TABLE 1

| Syntax | Size (Bits) | Notes |
|---|---|---|
| CDMA_Allocation_A-MAP IE( ) { | — | |
| A-MAP IE Type | 4 | CDMA Allocation A-MAP IE |

TABLE 1-continued

| Syntax | Size (Bits) | Notes |
|---|---|---|
| CDMA allocation indication | 1 | 0b0: Bandwidth allocation in response to a received contention-based bandwidth request<br>0b1: Bandwidth allocation in response to a received contention-based ranging request |
| If (CDMA allocation indication ==0b0){ | | |
| Resource Index | 11 | 5 MHz: 0 in first 2 MSB bits + 9 bits for resource index<br>10 MHz: 11 bits for resource index<br>20 MHz: 11 bits for resource index<br>Resource index includes location and allocation size. |
| Long TTI Indicator | 1 | Indicates number of AAI subframes spanned by the allocated resource.<br>0b0: 1 AAI subframe (default)<br>0b1: 4 UL AAI subframes for FDD or all UL AAI subframes for TDD<br>If number of DL AAI subframes, D, is less than number of UL AAI subframes, U, Long TTI Indicator = 0b1 |
| HFA | 3 | HARQ Feedback Allocation |
| Reserved | 20 | Reserved bits |
| } | | |
| Else if (CDMA allocation indication == 0b1) { | | |
| Uplink/Downlink Indicator | 1 | Indicates whether the following fields are for resource assignment in the uplink or in the downlink<br>0b0: Uplink<br>0b1: Downlink |
| Resource Index | 11 | 5 MHz: 0 in first 2 MSB bits + 9 bits for resource index<br>10 MHz: 11 bits for resource index<br>20 MHz: 11 bits for resource index<br>Resource index includes location and allocation size |
| $I_{SizeOffset}$ | 5 | Offset used to compute burst size index |
| HFA | 3 | HARQ Feedback Allocation |
| If (Uplink/Downlink Indicator==0b0) { | | |
| iotFP | 7 | IoT value of Frequency Partition used for AMS resource assignment, quantized in 0.5 dB steps as IoT level from 0 dB to 63.5 dB., detail reference to 16.2.3.30 AAI-ULPC-NI message |
| offsetControl | 6 | offsetControl is the transmit power adjustment value transmitted by the ABS. It represents the value among -15.5 to 16 dB with 0.5 dB step |
| AI_SN | 1 | HARQ identifier sequence number |
| Long TTI Indicator | 1 | Indicates number of AAI subframes spanned by the allocated resource<br>0b0: 1 AAI subframe (default)<br>0b1: 4 UL AAI subframes for FDD or all UL AAI subframes for TDD<br>If number of DL AAI subframes, D, is less than number of UL AAI subframes, U, Long TTI Indicator = 0b1 |
| } Else { | | |
| ACID | 4 | HARQ channel identifier |
| AI_SN | 1 | HARQ identifier sequence number |
| SPID | 2 | HARQ subpacket identifier for HARQ IR |
| Reserved | 8 | Reserved bits |
| }<br>}<br>} | | |

Referring to Table 1, when the MS transmits ranging to the BS, the BS may transmit uplink resource information allocated for transmission of the ranging request message to the MS through a resource index field.

Up to now, the process of performing initial ranging or handover ranging at the MS has been described. As described above, the uplink transmit power value used to perform initial ranging or handover ranging at the MS was calculated by Equation 3 or 4.

Hereinafter, the uplink transmit power value used when the MS transmits a ranging request message to the BS in step S240 will be described. When the MS performs an initial ranging procedure or a handover ranging procedure, it may be necessary to set power necessary to transmit a ranging request message (that is, an AAI-RNG-REQ message) in an uplink resource region allocated as a burst type for a HARQ operation.

As described above, in order to set general power, the MS may use a power control equation such as Equation 1. Before the MS transmits the ranging request message (AAI-RNG-REQ) message to the BS after initial ranging or handover ranging, all individual parameters necessary for Equation 1 or 2 should be received. However, since these individual parameters are not configured as one information type and transmitted from the BS, the MS should wait until all individual parameters have been received. However, since it takes considerable time to receive all the individual parameters, there is a need for another method.

Accordingly, it is necessary to additionally define a power correction factor necessary for uplink transmission after initial ranging or handover ranging (S210). The BS may inform the MS which performs initial ranging or handover ranging of the resource size and location for AAI-RNG-REQ and I_offset (that is, a modulation and coding scheme (MCS) level) through the CDMA allocation A-MAP IE (S230). The MS which receives this message should transmit a ranging request message (the AAI-RNG-REQ message) to the BS.

The MS may receive the AAI-RNG-ACK message and/or the CDMA allocation A-MAP IE message from the BS (S220 and S230) before transmitting the ranging request message (the AAI-RNG-REQ message) to the BS. Since the BS may confirm the PSD level of the MS which performs initial ranging or handover ranging, it is possible to correct and set additional power of the ranging request (RNG-REQ) of the MS. Hereinafter, various embodiments of the method of setting power for ranging request message transmission of the MS will be described.

First Embodiment

The BS may set power used when the MS transmits the ranging request message (AAI-RNG-REQ message) to the same PSD level as power used to transmit initial ranging or handover ranging in step S210. At this time, the PSD level is a unit such as dBm/Hz, dBm/subcarrier or dBm/resource unit.

Second Embodiment

The MS may set a value obtained by adding or subtracting a predetermined value (e.g., xdB) to or from the PSD level used to transmit initial ranging or handover ranging as transmit power used for ranging request transmission.

Third Embodiment

The BS may further include the power correction value of the message (the AAI-RNG-REQ message) for requesting ranging in the AAI-RNG-ACK message transmitted in step S220 or the CDMA allocation A-MAP IE message transmitted in step S230 and transmit the message to the MS. The power correction value is a power correction value of a transmit power value when initial ranging is lastly (recently or finally) performed. This is expressed by Equation 5.

$$P_{Tx,RNG\_REQ} = P_{Tx,IR\_last} + \text{power\_correction\_value} \quad \text{Equation 5}$$

where, $P_{Tx,RNG\_REQ}$ denotes a transmit power value used for the MS to transmit the ranging request message, $P_{Tx,IR\_last}$ denotes a power value used for the MS to lastly (finally) transmit initial ranging message, and power_correction_value is a power correction value used for the MS to transmit the ranging request message, which is received from the BS through the AAI-RNG-ACK message or the CDMA allocation A-MAP IE message.

If the power correction value used for the MS to transmit the ranging request message is transmitted through the AAI-RNG-ACK message, the BS may further include, in the AAI-RNG-ACK message, the power correction value (power_correction_value) (e.g., xx bits dB) for transmitting the ranging request message in addition to the power adjustment level for correcting power when performing next initial ranging or handover ranging and transmit the AAI-RNG-ACK message.

If the power correction value used when the MS transmits the ranging request message is transmitted through the CDMA allocation A-MAP IE message, the CDMA allocation A-MAP IE may be transmitted in a state of further including the power correction value for transmission of the ranging request message in addition to uplink resource allocation information for transmission of the ranging request message by the MS.

Although Equation 5 includes the power value item lastly used by the MS upon initial ranging, if the MS performs handover ranging, Equation 5 may include the power value lastly used by the MS upon handover ranging.

Fourth Embodiment

In the third embodiment, even when the power correction value of the AAI-RNG-REQ message is defined only in the AAI-RNG-ACK message, the MS does not receive the AAI-RNG-ACK message, receives CDMA allocation A-MAP IE message and transmits the AAI-RNG-REQ message, the method described in the first embodiment or the second embodiment may be used.

That is, although the power correction value used to determine the power value for transmission of the ranging request message by the MS is defined only in the AAI-RNG-ACK message, the MS does not receive the AAI-RNG-ACK message, receives a CDMA allocation A-MAP IE message and transmits the AAI-RNG-REQ message, the BS may set the same PSD level as power used to transmit initial ranging or handover ranging at the MS as a power value. In this case, the MS may transmit the ranging request message with the same level as the PSD level used for initial ranging or handover ranging transmission.

In this case, if the BS sets a predetermined value in advance at a PSD level used for initial ranging or handover ranging of the MS, the MS may determine a power value for transmitting the ranging request message by adding or subtracting the predetermined value (e.g., xdB) to or from the PSD level used for initial ranging or handover ranging and transmit the ranging request message using the determined value.

In the fourth embodiment, the case in which, even when the power correction value for the AAI-RNG-REQ message is defined only in the AAI-RNG-ACK message, the MS does not receive this message and receives the CDMA allocation A-MAP IE message and transmits the AAI-RNG-REQ message is described. However, the present invention is applicable to the case in which, even when the power correction value for the AAI-RNG-REQ message is defined in the CDMA allocation A-MAP IE message, the MS does not receive this message and receives the AAI-RNG-ACK message and transmits the ranging request message.

Fifth Embodiment

When the MS performs handover ranging, only the AAI-RNG-ACK message may be defined. In the present embodiment, when the MS performs handover ranging, the BS may transmit only the AAI-RNG-ACK message to the MS. At this time, the AAI-RNG-ACK message transmitted to the MS includes the power correction value for transmission of the ranging request message (AAI-RNG-REQ message) of the MS.

In the above-described embodiments, the MS may perform a random access/initial ranging procedure in order to perform uplink synchronization with a serving BS or a target BS. Since the MS should random access/initial ranging without being aware of power control information/power control parameter suitable for the system, it is necessary to separately define power control for random access/initial ranging. The MS which successfully performs random access/initial ranging may set a next transit power value using the successful PSD level. This is valid until all information necessary for power control is received and power control is performed.

The above description is also applicable to a downlink/uplink multicarrier system. For example, if an MS performs random/access/initial ranging only in a specific carrier and performs ranging request transmission in another carrier B, a value $P_{last}$ of the uplink carrier A (that is, a last power value used by the MS upon initial ranging or handover ranging transmission in the carrier A) may be used in the carrier B. In this case, a physical difference between the carriers may be corrected and transmit power may be set per carrier. In particular, this is more efficiently applicable to adjacent carriers (e.g., carriers A and B).

Unlike the above-described techniques, if all a downlink synchronization channel, system information and power control information are received before the MS performs initial uplink synchronization, power necessary for uplink synchronization transmission may also be determined using Equations 1 and 2 instead of Equations 3 and 4. This may not be suitable for the case in which fast uplink transmission with a serving BS/handover BS is necessary.

According to the various embodiments of the present invention, it is possible to efficiently set power necessary for uplink data transmission before all power control information is received after an MS performs initial uplink synchronization.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The device and method for controlling uplink transmit power is industrially applicable to various communication systems such as 3GPP LTE, LTE-A and IEEE 802.

The invention claimed is:

1. A method of controlling an uplink transmit power at a mobile station in a wireless communication system, the method comprising:
   transmitting, to a base station, an initial ranging signal for uplink synchronization with the base station;
   receiving a ranging acknowledgement message including a ranging status from the base station in response to the initial ranging signal, wherein the ranging acknowledgement message is an AAI-RNG-ACK message;
   receiving a code division multiple access (CDMA) allocation A-MAP IE including a power correction value from the base station;
   when the ranging status is a success, determining a transmission power value of a ranging request message based on the power correction value and a last initial ranging transmission power value, wherein the ranging request message is an AAI-RNG-REQ message; and
   transmitting the ranging request message to the base station based on the transmission power value of the ranging request message.

2. The method according to claim 1, wherein the ranging acknowledgement message further includes acknowledgement/negative acknowledgement (ACK/NACK) for transmission of the initial ranging signal or a handover ranging signal.

3. The method according to claim 1, wherein the ranging acknowledgement message further includes uplink resource allocation information for transmission of the ranging request message and the ranging request message is transmitted through an uplink resource indicated by the uplink resource allocation information.

4. The method according to claim 1, wherein the transmission power value of the ranging request message is determined by adding the power correction value to the last initial ranging transmission power value.

5. A method of controlling an uplink transmit power of a mobile station (MS) at a base station in a wireless communication system, the method comprising:
   receiving, from a mobile station, an initial ranging signal for an uplink synchronization with the mobile station;
   transmitting a ranging acknowledgement message including a ranging status to the mobile station in response to the initial ranging signal, wherein the ranging acknowledgement message is an AA-RNG-ACK message;
   transmitting a code division multiple access (CDMA) allocation A-MAP IE including a power correction value to the mobile station;
   when the ranging status is a success, receiving, from the mobile station, a ranging request message transmitted based on a transmission power value of the ranging request message, wherein the ranging request message is an AAI-RNG-REQ message, and
   wherein the transmission power value of a ranging request message is determined based on the power correction value and a last initial ranging transmission power value.

6. The method according to claim 5, wherein the ranging acknowledgement message further includes acknowledgement/negative acknowledgement (ACK/NACK) for transmission of the initial ranging signal or a handover ranging signal.

7. The method according to claim 5, wherein the ranging acknowledgement message further includes uplink resource allocation information for transmission of the ranging request message and the ranging request message is transmitted through an uplink resource indicated by the uplink resource allocation information.

8. The method according to claim 5, wherein the transmission power value of the ranging request message is determined by adding the power correction value to the last initial ranging transmission power value.

9. A mobile station for controlling uplink transmit power in a wireless communication system, the mobile station comprising:
   a transmitter configured to transmit, to a base station, an initial ranging signal for an uplink synchronization with the base station;
   a receiver configured to:
      receive a ranging acknowledgement message including a ranging status from the base station in response to the initial ranging signal, wherein the ranging acknowledgement message is an AAI-RNG-ACK message; and
      receive a code division multiple access (CDMA) allocation A-MAP IE including a power correction value from the base station,
   a processor configured to, when the ranging status is a success, determine a transmission power value of a ranging request message based on the power correction value and a last initial ranging transmission power value, wherein the ranging request message is an AAI-RNG-REQ message; and
   wherein the transmitter is further configured to transmit the ranging request message to the base station based on the transmission power value of a ranging request message.

10. The mobile station according to claim 9, wherein the ranging acknowledgement message further includes acknowledgement/negative acknowledgement (ACK/NACK) for transmission of the initial ranging signal or a handover ranging signal.

11. The mobile station according to claim 9, wherein the processor is further configured to determine the transmission power value of the ranging request message by adding the power correction value to the last initial ranging transmission power value.

12. A base station for controlling uplink transmit power of a mobile station in a wireless communication system, the base station comprising:
   a receiver configured to receive, from a mobile station, an initial ranging signal for an uplink synchronization with the mobile station;
   a transmitter configured to:

transmit a ranging acknowledgement message including a power correction value and a ranging status to the mobile station in response to the initial ranging signal, wherein the ranging acknowledgement message is an AAI-RNG-ACK message; and transmit a code division multiple access (CDMA) allocation A-MAP IE including a power correction value to the mobile station, wherein the receiver is further configured to receive, from the mobile station, when the ranging status is a success, a ranging request message transmitted based on a transmission power value of the ranging request message, wherein the ranging request message is an AAI-RNG-REQ message, and wherein the transmission power value of the ranging request message is determined based on the power correction value and a last initial ranging transmission power value.

13. The base station according to claim 12, wherein the ranging acknowledgement message further includes acknowledgement/negative acknowledgement (ACK/NACK) for transmission of the initial ranging signal or a handover ranging signal.

14. The base station according to claim 12, wherein the ranging acknowledgement message further includes uplink resource allocation information for transmission of the ranging request message, and wherein the receiver is further configured to receive the ranging request message through an uplink resource indicated by the uplink resource allocation information.

* * * * *